Nov. 24, 1959 — W. A. FOUST — 2,914,179
LIQUID FILTER CARTRIDGE
Filed May 18, 1956 — 2 Sheets-Sheet 1
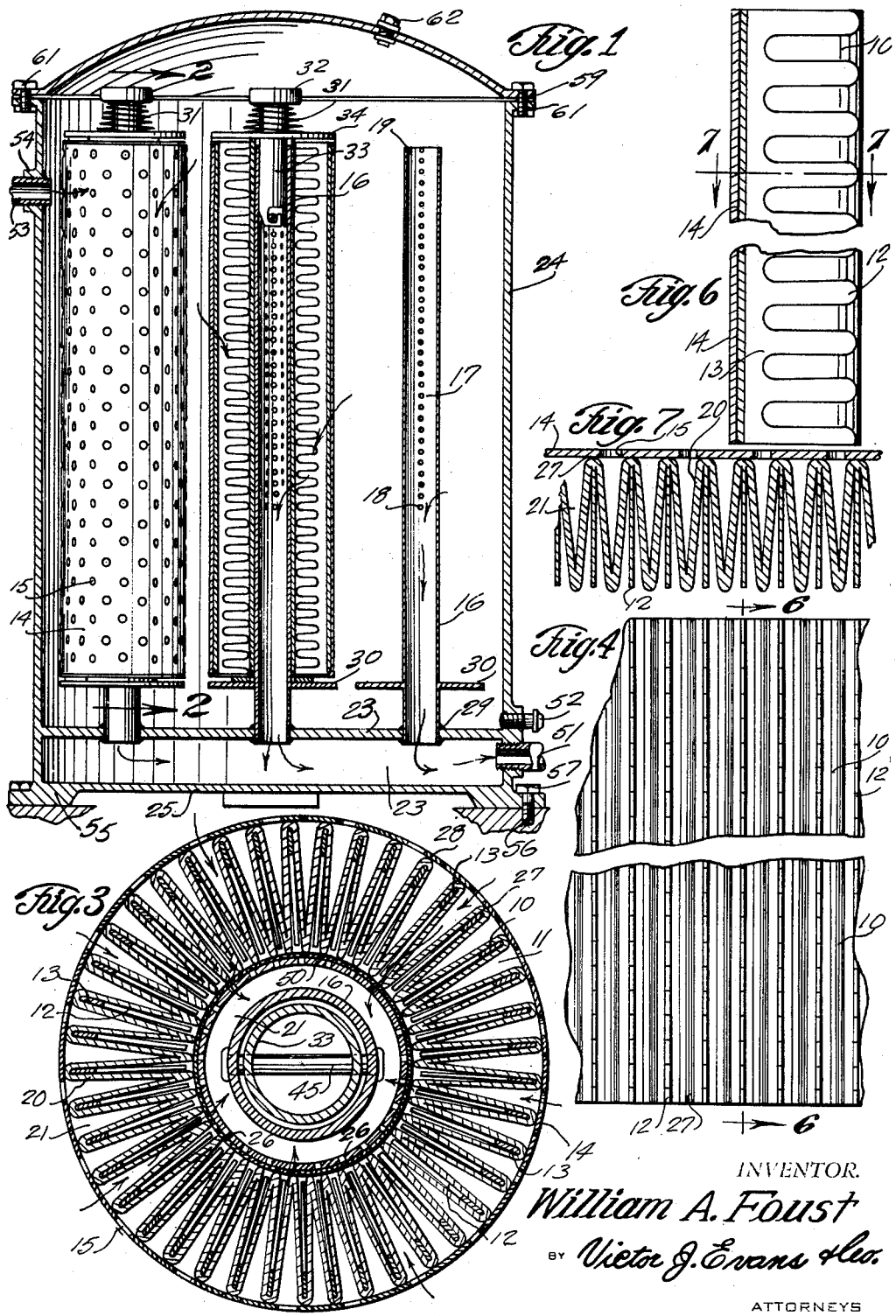
INVENTOR.
William A. Foust
BY Victor J. Evans & Co.
ATTORNEYS Nov. 24, 1959 W. A. FOUST 2,914,179
LIQUID FILTER CARTRIDGE
Filed May 18, 1956 2 Sheets-Sheet 2
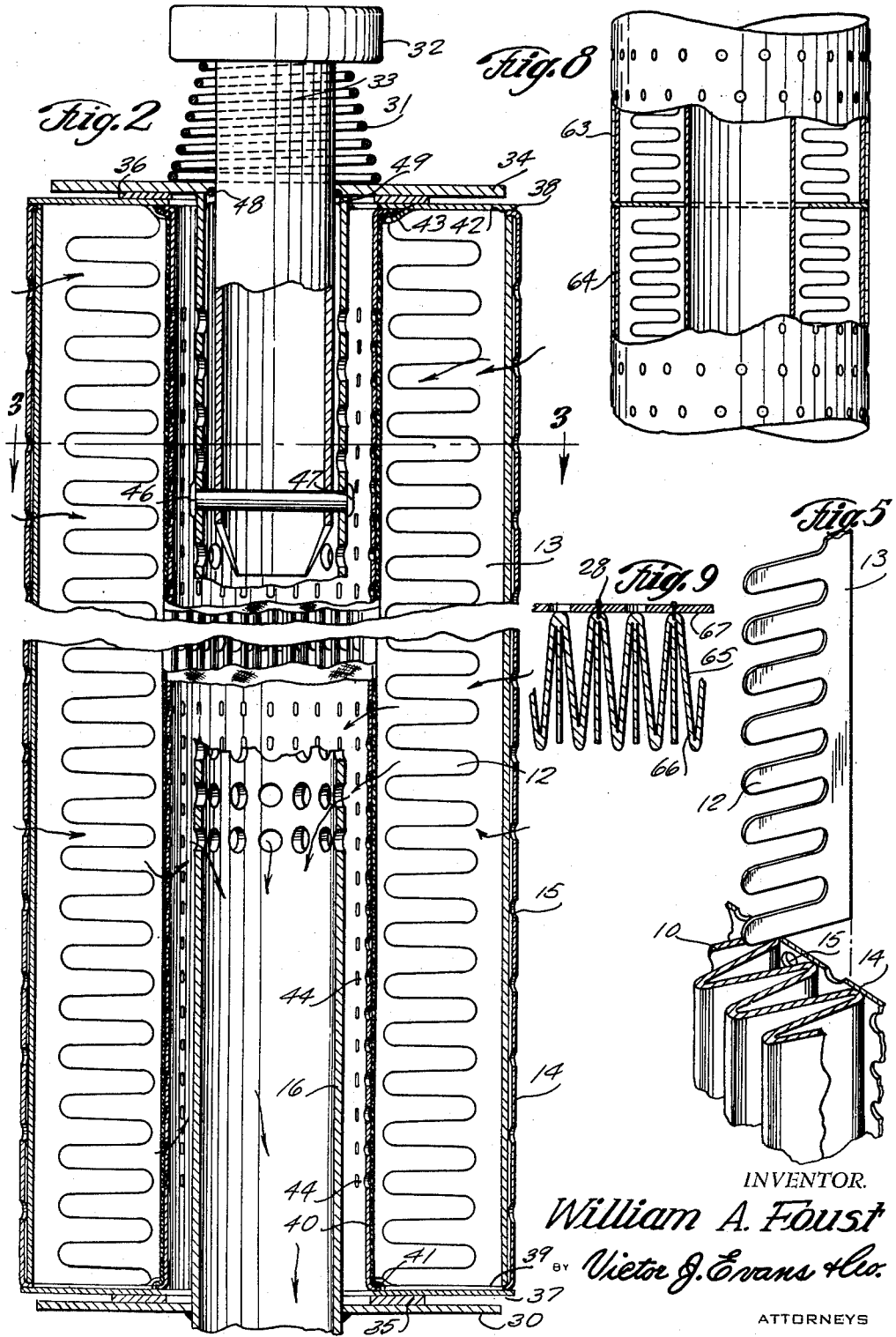
INVENTOR.
William A. Foust
BY Victor J. Evans &Co.
ATTORNEYS

United States Patent Office 2,914,179
Patented Nov. 24, 1959

2,914,179
LIQUID FILTER CARTRIDGE

William A. Foust, Gaithersburg, Md.

Application May 18, 1956, Serial No. 585,656

1 Claim. (Cl. 210—323)

This invention relates to filters particularly of the type adapted for filtering liquids in relatively large quantities, and in particular a cylindrical cartridge with a centrally disposed outlet tube wherein with the cartridge immersed in liquid in a tank and with a perforated center tube opening into a compartment in the lower end of the tank in which the liquid is positioned only filtered material passes into the compartment.

The purpose of this invention is to provide a filter having relatively high capacity wherein the device is particularly adapted for filtering lubricating fluids of diesel locomotives.

Numerous attempts have been made to increase the surface area of filtering elements whereby the capacity of a filter of limited size may be increased so that large quantities of liquid may be filtered in restricted areas, however, it is difficult to increase the surface area of a conventional filter because the filtering elements are usually formed of flat screens or sheets of filtering material and such devices require supporting frames and particular circulating elements. With this thought in mind this invention contemplates an improved filter cartridge wherein a continuous filtering element is formed with a pleated fold or is corrugated whereby with the corrugations are retained in spaced relation by serrated spacing elements and with the filtering element rolled to form a cylinder whereby a maximum surface area is provided and relatively large quantities of liquid, and particularly oil, may be filtered in a comparatively small area.

The object of this invention is, therefore, to provide means for forming a filtering element whereby maximum surface area is obtained in a limited space.

Another object of the invention is to provide means for forming a filtering element or cartridge wherein a sheet of filtering material is formed with a pleat like fold in a cylinder so that a plurality of such elements may be positioned in a tank.

Another important object of the invention is to provide an improved filter cartridge having a relatively thick cylindrical wall with a continuous element formed with a zig-zag fold and in which filtered material is adapted to flow through a center tube to a compartment below wherein water and other foreign products may be trapped in the lower part of a container in which the filtering element is positioned.

A further object of the invention is to provide an improved cartridge for a filter in which maximum surface area is obtained and in which means is provided for preventing pleat like folds of the element collapsing in which the cartridge is of a simple and economical construction.

With these and other objects and advantages in view the invention embodies a continuous sheet of filtering material formed with pleats or folds and rolled to form a cylinder with a perforated outer shell and with spaced tongues between the folds and in which a tube with a perforated upper end for carrying filtered products to the lower end of the filter is positioned in the center.

Other features and advantages of the invention will appear from the following description taken in connection with the drawings, wherein:

Figure 1 is a vertical section through a filter housing or tank showing one of the cartridges of this invention in elevation therein with another cartridge shown in section and with one of the center tubes of a cartridge shown in section, and the filtering elements omitted.

Figure 2 is a vertical section through one of the cartridges with the parts shown on an enlarged scale, and with parts broken away.

Figure 3 is a sectional plan through the filter taken on line 3—3 of Figure 2 with the parts also shown on an enlarged scale.

Figure 4 is an elevational view looking towards the inner surface of a portion of the filter element.

Figure 5 is a perspective view illustrating a portion of the filter element in combination with one of the serrated elements including a plurality of tongues positioned between folds of the filter for preventing collapsing thereof.

Figure 6 is a vertical section taken on line 6—6 of Figure 4 also showing the serrated strips or tongues positioned between the folds of the filter element.

Figure 7 is a sectional plan taken on line 7—7 of Figure 6 showing the folds of a filter element and also showing the tongues or serrated strips positioned between the folds.

Figure 8 is a view showing a modification wherein filter elements or cartridges are positioned end to end and it will be understood that as many of the cartridges, as may be desired, may be assembled in end to end relation.

Figure 9 is a sectional plan similar to that shown in Figure 7, showing a modification wherein the outer ends of the folds of the filter are secured to the shell with staples.

Referring now to the drawings wherein like reference characters denote corresponding parts the improved filter cartridge of this invention includes a corrugated sheet of filter material 10 formed with pleats or folds and rolled to provide a cylinder, as illustrated in Figure 3, and the body of the cylinder includes triangular shaped areas or V-shaped cells 11 positioned between the folds and opening toward the outside of the cylinder whereby vertexes of the triangular shaped areas extend toward the center. The triangular shaped elements are supported by tongues 12 extended from backing strips 13 positioned in the fold with the backing strips in outer portions of the fold and the tongues extended inwardly toward the center. The filter element is contained in a cylindrical shell 14 having perforations 15 therein and with the cylindrical element positioned over a center tube 16 having perforations 17 extended from points 18 to upper ends 19 thereof, liquid, such as oil passes through webs 20 of the folds of the filtering element into the center 21 and through the perforations 17 and tube 16 downwardly into the compartment 22 between a false bottom 23 of a housing 24 and a bottom 25 at the lower end of the housing.

The pleats or folds of the filter element extend from points 26 on the inner side of the filtering element to points 27 at the outside or on the inner surface of a shell 14 and the tongues 12 of the backing strips 13 also extend to the inner edges 26 of the folds.

The points 27 of the periphery of the filter element are secured to the shell 14 by an adhesive or by staples 28 or other suitable fastening means.

The tubes 16, which are secured in the false bottom or partition 23, such as by welding, as shown at the points 29, are provided with flanges 30 upon which the cylindrical elements are positioned and the cylindrical elements are retained in position by springs 31 positioned between collars 32 on the upper ends of tubes 33 extended into the upper ends of the tubes 16 and flanges 34 on the upper ends of the tubes 16, as illustrated in Figure 2. Washers 35 and 36 are positioned between the flanges or discs 30 and 34, respectively, and discs 37 and 38 on the ends of the filter elements. The disc 37 is positioned against the outer surface of an annular inwardly extended rim 39 on the lower end of the shell 14 and the inner edge of the disc 37 is secured to the lower end of an inner tube 40 with a sealing connection 41. The disc 38, which is positioned upon an inwardly extended annular rim 42 on the upper end of the shell 14 is secured to the upper end of the inner tube 40 with a similar sealing connection 43.

The inner tube 40 is also provided with perforations 44 similar to the perforations 15 of the outer tube or shell 14 and, as illustrated in Figure 8, the perforations are staggered.

By this means the corrugated cylindrical filter element is retained between an inner shell 40 and an outer shell 14 with the corrugations or webs folded, such as forming pleats or folds, as illustrated in Figure 3 and the ends thereof are secured together by suitable fastening means, such as an adhesive, staples, or stitches.

The upper ends of the tubes 16 are secured to the tubes 33 by studs 45 having heads 46 and 47 on the extended ends. The area between the tubes 33 and 16 is sealed by a packing gland 48 in an inner annular rim 49 of the flange 84.

With the cartridges assembled in this manner they are positioned in the housing 24 with the flanges at the lower ends of a plurality of cartridges spaced above the partition 23 and with the housing 24 filled with liquid, the liquid, such as oil, in particular, passes through the perforations 15 of the outer shell 14 into the dirt receiving areas 11 with the oil filtering through the webs 20 of the filter elements into an area 50 between the folds or corrugations, and which are retained open by fingers 12. From the areas 50 the oil passes through the perforations 44 in the inner tubes 40 and also through the perforations 17 of the tubes 16, passing downwardly into the compartment 22 in the lower end of the housing and from which the oil is drawn through a tube 51.

The lower end of the housing 24 is provided with a drain plug 52 and oil is supplied to the housing through a nipple 53 that is threaded into a boss 54, spaced from the upper end of the housing.

The housing 24 is provided with a base flange 55 by which the housing may be secured upon a foundation 56 with bolts 57, and the upper end of the housing is provided with a cover 58, an annular flange 59 of which is secured to a flange 60 on the upper end of the housing 24 with bolts 61.

With the filter element or cartridge formed in this manner the element includes a plurality of isosceles triangles, the vertexes of which extend toward the center and the base portions of which are positioned against the outer shell or tube 14. The webs forming the sides of the triangles and through which the oil passes are retained in spaced relation to webs of adjoining triangles by spaced tongues or serrated strips. With these elements sealed within the inner and outer shells or tubes it is impossible for fluid to bypass the filter elements and all fluid passing through the filter is received in the triangularly shaped areas from which it filters through the web portions of the folds and into the center tubes from the lower ends of which the clean fluid passes into the chamber 22 and out through the connection 51.

The filter elements are adapted to be removed, replaced with similar elements, or readily cleaned and replaced.

The cover 58 may be provided with a vent 62, as shown in Figure 1.

In the design shown in Figure 8 filter elements 63 and 64, similar to the element, shown in Figure 3, are positioned end to end with the ends secured by a suitable adhesive, and it will be understood that as many units as may be desired may be secured together and positioned end to end as shown in Figure 8, or in a circle as shown in Figure 1.

As shown in Figure 9, the outer edges of the folds 65 of the filter element 66 are secured by the staples 28 to the outer shell 67.

It will be understood that modifications, within the scope of the appended claim, may be made in the design and arrangement of parts without departing from the spirit of the invention.

What is claimed is:

In a filter cartridge, the combination which comprises a perforated center tube, a flange integral with and extended around the center tube, a disc having an opening therethrough positioned on the flange of the center tube, a perforated inner tube positioned on the disc and extended upwardly from the inner edge of the opening therethrough, a cylindrical filtering element positioned on said disc and extended around the inner tube, said cylindrical filtering element including a sheet of filter material formed in an accordian fold providing a continuous row of V-shaped cells defining triangular-shaped areas with vertexes at the central portion in engagement with said inner tube and with the vertexes at the periphery positioned in a circle, vertically disposed backing strips having vertically-spaced tongues extended inwardly therefrom positioned in the peripheral vertexes of each of the folds providing stiffening means for the filter material and preventing collapsing thereof, a perforated cylindrical shell positioned around the filter element, a disc having an opening therethrough positioned on the upper edges of the inner tube and cylindrical shell, a flange extended around the center tube and positioned above the last mentioned disc, a tube having a collar on the upper end extended into the upper end of the center tube, means for adjustably connecting the tube having the collar thereon to the center tube, and a spring extended around the tube having the collar on the upper end and positioned between said collar and the flange positioned on the disc for urging elements of the filter into longitudinal engagement.

References Cited in the file of this patent

UNITED STATES PATENTS

| 2,080,154 | Strindberg | May 11, 1937 |
| 2,413,991 | Newman | Jan. 7, 1947 |
| 2,463,137 | Bahlke | Mar. 1, 1949 |
| 2,468,862 | Briggs | May 3, 1949 |
| 2,507,125 | Townsend | May 9, 1950 |
| 2,565,445 | Winslow et al. | Aug. 21, 1951 |
| 2,627,350 | Wicks | Feb. 3, 1953 |
| 2,657,808 | Mankin | Nov. 3, 1953 |
| 2,681,155 | Graham | June 15, 1954 |
| 2,689,652 | Gretzinger | Sept. 21, 1954 |

FOREIGN PATENTS

| 727,398 | Great Britain | Mar. 30, 1955 |
| 1,059,010 | France | Nov. 10, 1953 |